US012307178B2

(12) United States Patent
Chonnad

(10) Patent No.: US 12,307,178 B2
(45) Date of Patent: May 20, 2025

(54) STRUCTURAL ANALYSIS FOR DETERMINING FAULT TYPES IN SAFETY RELATED LOGIC

(71) Applicant: Synopsys, Inc., Mountain View, CA (US)

(72) Inventor: Shivakumar Shankar Chonnad, San Jose, CA (US)

(73) Assignee: Synopsys, Inc., Sunnyvale, CA (US)

( * ) Notice: Subject to any disclaimer, the term of this patent is extended or adjusted under 35 U.S.C. 154(b) by 694 days.

(21) Appl. No.: 17/680,226

(22) Filed: Feb. 24, 2022

(65) Prior Publication Data
US 2022/0269846 A1 Aug. 25, 2022

Related U.S. Application Data

(60) Provisional application No. 63/153,779, filed on Feb. 25, 2021.

(51) Int. Cl.
*G06F 30/3323* (2020.01)
*G06F 11/22* (2006.01)

(52) U.S. Cl.
CPC ........ *G06F 30/3323* (2020.01); *G06F 11/221* (2013.01)

(58) Field of Classification Search
USPC ........................................ 716/106
See application file for complete search history.

(56) References Cited

U.S. PATENT DOCUMENTS

| 10,789,404 | B1* | 9/2020 | Mukherjee | ............. G06F 30/33 |
| 10,983,758 | B1* | 4/2021 | Mukherjee | ......... G06F 30/3323 |
| 10,984,161 | B1* | 4/2021 | Mukherjee | ......... G06F 30/3323 |
| 11,216,606 | B1* | 1/2022 | Turbovich | ......... G06F 30/3308 |
| 11,250,198 | B2* | 2/2022 | Grosse | ........... G01R 31/318342 |
| 11,416,662 | B1* | 8/2022 | Armato | ............... G06F 30/3308 |
| 2019/0018910 | A1* | 1/2019 | Xiang | ................... G06F 30/396 |
| 2021/0064810 | A1* | 3/2021 | Grosse | ........... G01R 31/318342 |

OTHER PUBLICATIONS

Interational Preliminary Report on Patentability, International Application No. PCT/US2022/017781, Dated Sep. 7, 2023 consists of 10 pages.

(Continued)

*Primary Examiner* — Mohammed Alam
(74) *Attorney, Agent, or Firm* — Patterson + Sheridan, LLP

(57) ABSTRACT

A method for determining fault types in a circuit design includes obtaining circuit elements, a first observation point of a first circuit element, and a first diagnostic point of a first safety circuit device. The method further includes determining a first cone of influence including a first subset of the circuit elements based on the first observation point. The first subset of the circuit elements includes the first circuit element. Further, the method includes determining a first safety cone including a second subset of the circuit elements based on the first diagnostic point. The first safety cone includes the first safety circuit device. The method further includes determining a fault type associated with the circuit elements based on an intersection between the first cone of influence and the first safety cone.

20 Claims, 9 Drawing Sheets

(56) References Cited

OTHER PUBLICATIONS

Interational Search Report and Written Opinion, International Application No. PCT/US2022/017781, Dated Jun. 9, 2022 consists of 16 pages.
Jafri Asif et al, "Proving the Capability of Arm IP for Functional Safety Applications", Proceedings of the 19th IEEE International Workshop on Microprocessor and soc Test and Verification, Dec. 9, 2018 (Dec. 9, 2018) pp. 1-5.
Riccardo Mariani et al, "Using an innovative SoC-level FMEA methodology to design in compliance with IEC61508", Proceeings of The Design, Automation & Test in Europe Conference & Exhibition, Apr. 16, 2007 pp. 492-497.
Wali Imran et al, "Towards approximation during test of Integrated Circuits" Proceedings of the 20th IEEE International Symposium on Design and Diagnostics of Electronic Circuits & Systems, Apr. 19, 2017 (Apr. 19, 2017), pp. 28-33.
Sini J et al: "Towards an automatic approach for hardware verification according to ISO 26262 functional safety standard" Proceedings of the 24th IEEE International Symposium on On-Line Testing and Robust System Design, Jul. 2, 2018, pp. 287-290.

\* cited by examiner

STRUCTURAL ANALYSIS FOR DETERMINING FAULT TYPES IN SAFETY RELATED LOGIC

RELATED APPLICATION

This application claims the benefit of U.S. provisional patent application Ser. No. 63/153,779, filed Feb. 25, 2021, which is hereby incorporated herein by reference.

TECHNICAL FIELD

The present disclosure relates to circuit logic analysis, and more particularly to structural analysis for safety-related circuit logic to deduce fault types.

BACKGROUND

In integrated circuit (IC) designs, e.g., system-on-chip (SoC) designs, among others, functional safety is an important metric depending on the type of application an IC design implemented. In automotive implementations (applications), IC designs include added logic (e.g., safety mechanisms) based on the size, functions, and variables of the IC design, increasing the complexity of the IC designs. The added logic is used to detect faults within the IC devices generated from the IC designs. In automotive implementations, an IC design is implemented with additional circuit elements that monitor for and detect faults within the IC design. In an automotive implementation, as humans, electronics, and machines interact amongst each other in real-time, an IC is designed to address and monitor input data provided by human, electronic and machine interactions to ensure safe operation.

SUMMARY

In one example, a method includes obtaining circuit elements, a first observation point, and a first diagnostic point of a circuit design. The first observation point is at an output of a first circuit element of the circuit elements of the circuit design. The first diagnostic point is at an output of a first safety circuit device of the circuit design. The method further includes determining a first cone of influence including a first subset of the circuit elements based on the first observation point. The first subset of the circuit elements includes the first circuit element. Further, the method includes determining a first safety cone including a second subset of the circuit elements based on the first diagnostic point. The first safety cone includes the first safety circuit device. The method further includes determining a fault type associated with the circuit elements based on an intersection between the first cone of influence and the first safety cone.

In one example, a method includes obtaining circuit elements, a first observation point, and a first diagnostic point of a circuit design. The first observation point is at an output of a first circuit element of the circuit elements of the circuit design. The first diagnostic point is at an output of a first safety circuit device of the circuit design. The method further includes determining a first cone of influence including a first subset of the circuit elements based on the first observation point. The first subset includes the first circuit element. Further, the method includes determining a first safety cone including a second subset of the circuit elements based on the first diagnostic point. The first safety cone includes the first safety circuit device. The method further includes determining that the first subset of the circuit elements within the first cone of influence is associated with a dangerous fault type that affects a safety goal of the circuit design. Further, the method includes determining a third subset of the circuit elements that are outside the first cone of influence based on a comparison between the first subset of circuit elements and the circuit elements. The third subset of the circuit elements is associated with a non-dangerous fault type that does not affect the safety goal of the circuit design. The method further includes determining that the second subset of the circuit elements that are within the first safety cone is associated with a dangerous fault type that is detectable by the first safety circuit device, and determining a fourth subset of the circuit elements associated with a non-detectable dangerous fault type that is not-detectable by the first safety circuit device based on a comparison of the first subset of the circuit elements and the second subset of the circuit elements.

In one example, a system includes a memory storing instructions and a processor. The processor is coupled with the memory and configured to execute the instructions. The instructions when executed cause the processor to obtain circuit elements, a first observation point, and a first diagnostic point of a circuit design. The first observation point is at an output of a first circuit element of the circuit elements of the circuit design. The first diagnostic point is at an output of a first safety circuit device of the circuit design. The processor is further causes to determine a first cone of influence including a first subset of the circuit elements based on the first observation point. The first subset of the circuit elements includes the first circuit element. The processor is further caused to determine a first safety cone including a second subset of the circuit elements based on the first diagnostic point. The first safety cone includes the first safety circuit device. Further, the processor is caused to determine a fault type associated with the circuit elements based on an intersection between the first cone of influence and the first safety cone.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
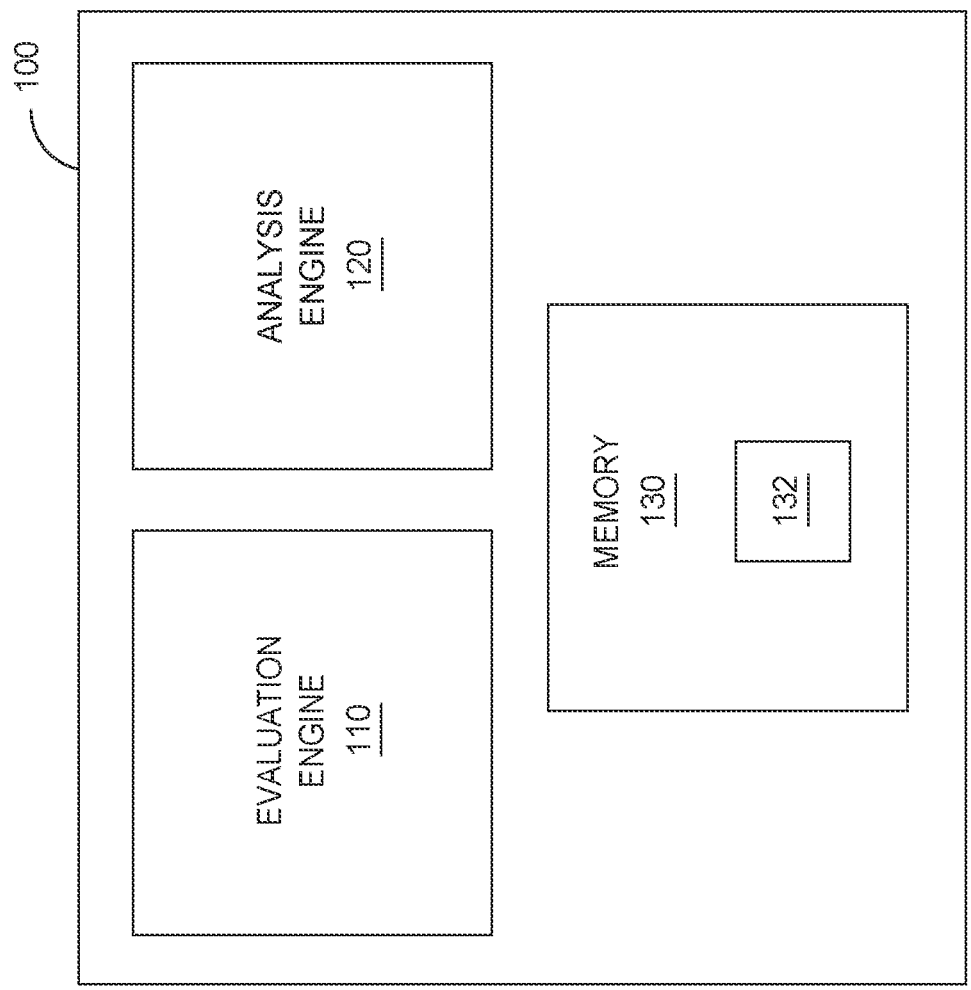
FIG. 1 depicts block diagram of a circuit evaluation system, in accordance with some embodiments of the present disclosure.

Aspects of the present disclosure relate to structural analysis for determining fault types in safety related logic.

Integrated circuit (IC) designs include safety circuit devices (e.g., safety mechanisms) that are used to detect faults within the IC designs. The IC designs may be system-on-chip (SoC) designs. The safety circuit devices detect failures associated with a cone of influence. A cone of influence for the safety circuit device may be referred to as a safety cone. A cone of influence includes one or more observation points (e.g., outputs) of an IC design, one or more inputs of the IC design, and one or more circuit elements of the IC design coupled between the one or more observation points and one or more inputs. The safety circuit devices are part of safety-related features of the IC design that are implemented to detect faults, or failures, within an IC device. For example, a fault may be due to a corrupted signal and/or a failed circuit element, among others. Detected faults may be mitigated by adjusting the functionality of a corresponding IC device. In other examples, other mitigation techniques may be applied. However, not all faults are detectable by an associated safety circuit device. The associated safety circuit device corresponds to the failure cone of the faults. Accordingly, such faults may lower the safety analysis rating for the corresponding IC device.

During the IC design process, data is collected based on faults and is used to determine functional safety-related aspects. The functional safety-related aspects may include a design failure mode effects and analysis (DFMEA) or fault tree analysis (FTA).

The DFMEA process includes capturing the various failure modes in an IC design, and determining an effect of each failure mode. An IC design includes safety-related design elements that includes non-safety-critical logic and safety-critical logic. Faults occurring in the non-safety-critical logic are deemed to not cause violations of safety goals within the IC design. Such faults may be referred to as safe faults. A fault is a failure within a circuit element or signal of the IC design. When circuit element fails, the functionality of the circuit element differs from that as expected. Further, a fault in a signal corresponds to a signal having an unexpected value.

A safety goal corresponds to desired functionality of the corresponding circuit device. For example, a safety goal corresponds to the correct transmission of signals and/or receipt of signals, among others. In one or more examples, when a circuit element (e.g., logic) involved in the transmission of data has a fault, a violation of a safety goal occurs. A safety circuit device, or another monitoring device (e.g., an external circuit or circuit element), may be used to detect faults. In one example, a violation of a safety goal may negatively affect the transmission of signals and/or receipt of signals. Such violations may lead to transmission errors and/or receiving errors, among others. Safe faults do not result in a failure (e.g., transmission error and/or receipt error, among others) within the IC design. Faults that result in a violation of a safety goal are deemed to be dangerous faults. Such faults may be determined to occur within safety-critical logic within the IC design.

The DFMEA process is completed at a hardware subpart level for the different hierarchies in the IC design. A given hardware subpart can have multiple failure modes and corresponding effects. Safety circuit devices (e.g., safety mechanisms) are implemented within, or external to, an IC device to prevent faults from leading to single-point failures and to prevent faults from being latent faults. A single-point failure is a hardware fault in an element (e.g., circuit component) that directly leads to the violation of a safety goal. Single-point faults are dangerous faults not covered (e.g., monitored or detected) by safety circuit devices. In one example, a single-point failure is a failure that stops the corresponding IC device or system from functioning as desired. A latent fault is an individual fault that is not detected by a faulty safety circuit device due to possible defect in safety circuit device. Such an individual latent fault caused by a fault in a circuit element (e.g., circuit component) and an independent fault in safety circuit is also called dual point fault.

A safety circuit device has an output port (e.g., a diagnostic point or port) that may be monitored to determine whether or not faults exist within a corresponding IC device. The output of a safety circuit device is useful to determine the mitigation scheme that is applied to address any failures.

Standards, such as International Organization for Standardization (ISO) 26262 rev. 2018-12 ("ISO 26262"), provide a framework for the detection and/or management of faults within an IC and/or corresponding system. In one example, a qualitative process is used in the detection and/or management of faults. However, the qualitative process is subjective to the individuals carrying out the testing. For example, the qualitative process includes expert judgement and sampling of intentional faults. In the expert judgement approach, a designer specifies a safety circuit device as suitable to detect all faults within a cone of influence of a failure mode. A cone of a failure mode includes one or more observation points (e.g., outputs), one or more inputs, and circuit elements coupled between the observation points and inputs. Sampling of intentional faults includes performing path analysis either through a system-based external script or a simulation to determine if an injected fault (e.g., intentional fault) is detected by a corresponding safety circuit device.

However, using a qualitative approach for detection and/or management within an IC design has a number of limitations. Specifically, a qualitative approach is potentially incomplete as the qualitative approach is cost prohibitive to perform an exhaustive analysis of all failure modes, detecting latent faults, and/or failure modes that span multiple hierarchies of an IC design. Further, a qualitative approach provides inaccurate value risk, and lacks traceable evidence to support distributions provided in a Failure Mode Effects and Diagnostic Analysis (FMEDA) which is a systematic analysis technique that is used to obtain failure rates, failure modes, and diagnostic capability of an IC design.

In the following, the present disclosure describes a system and method for providing fault detection in an IC design. Cones of influence of the safety circuit devices within the IC design are determined and used to identify detectable dangerous faults, undetectable dangerous faults, and safe faults within the IC design. Detectable dangerous faults are detected by a safety circuit device of the IC design. The dangerous faults affect a safety goal of the IC design, and safe faults do not affect a safety goal of the IC design. The identified detectable dangerous faults, undetectable dangerous faults, and the safe faults are used to determine the diagnostic coverage of the IC design. Further, as is described in greater detail in the following, an IC design utilizes redundant (e.g., secondary) safety circuitries to improve the fault detection of the IC design. The redundant safety circuitries may be additional safety circuitries added to the IC design and/or safety circuitries of another cone of influence. In one or more examples, the cones of influence of the failure modes and the safety circuitries within an IC design are determined. Further, the overlapping regions between cones of influence of the failure modes and the safety circuitries are determined. The detectability of faults is determined based on determining whether or not a fault overlaps with a cone of influence of a particular safety circuit device. A fault that falls within a cone of influence of a safety circuit device is determined to be detectable by that safety circuit device. A fault that is not within a cone of influence of a safety circuit device is not detectable by the corresponding safety circuit device. In one example, the cones of influence of the safety circuit devices may be used to detect primary and secondary safety circuitries for each potential fault, improving the safety analysis and fault performance of the corresponding IC design.

FIG. 1 illustrates a circuit evaluation system 100, according to one or more examples. The circuit evaluation system 100 may be an electronic design automation (EDA) system, or other circuit evaluation systems, circuit evaluation system, or circuit design system. The circuit evaluation system 100 is used during the design and/or verification of a circuit design. The circuit evaluation system 100 includes one or more processors (e.g., the processing device 902 of FIG. 9) that execute instructions (e.g., the instructions 926 of FIG. 9) stored in a memory (e.g., the main memory 904 and/or the machine-readable medium 924 of FIG. 9) to analyze a circuit design (e.g., a circuit design of an IC device), identify faults within the circuit design, and the type of the identified faults within the circuit design. In one or more examples, the circuit evaluation system 100 receives a circuit design, determines cones of influence associated with inputs and observation points (e.g., diagnostic points and other outputs), and components within (e.g., circuit elements including logic gates, flip-flops, and other circuit elements) the circuit design that are associated with different types of faults. In one example, a cone of influence from the observation points to the inputs is associated with a failure mode of the circuit design. Such a cone of influence may be referred to as a failure mode cone. In one example, a cone of influence is associated with a safety circuit device (e.g., a safety mechanism) of the circuit design from the diagnostic points to the inputs. Such a cone of influence may be referred to as a safety cone. Faults within a failure mode cone are referred to as dangerous faults. Faults that occur within the cone of influence of a safety circuit device can be detected by the safety circuit device and faults that occur outside of the cone of influence of the safety circuit device are not detected by the safety circuit device. Faults that occur within the intersection of cones of influence of a failure mode cone and that of its safety circuit device may be referred to as dangerous detectable faults. Further, faults that occur outside a cone of influence of a safety circuit device and within its failure mode cone may be referred to as dangerous undetectable faults. In one example, the circuit evaluation system 100 determines that a fault or faults that are not detectable by a first safety circuit device are detectable by a second safety circuit device based on intersection of the corresponding cones of influence. The second safety circuit device may be referred to as a redundant, backup, or secondary safety circuit device with regard to the first safety circuit device (e.g., primary safety circuit device). In one example, a redundant safety circuit device is able to detect faults when a fault, or failure, occurs within the first safety circuit device. Accordingly, the safety analysis and fault performance of the corresponding IC design is improved.

In one or more examples, the circuit evaluation system 100 determines design data by performing a structural analysis on a circuit design. The design data may be used to determine a diagnostic coverage for single point faults and latent faults. For latent faults, the circuit evaluation system 100 identifies a secondary (or redundant or back up) safety circuit device for a primary safety circuit device. In one example, the diagnostic coverage for the single point faults and latent faults may be analyzed to determine a safety level or classification, such as an Automotive Safety Integrity Level (ASIL), or another safety classification.

The circuit evaluation system 100 of FIG. 1 includes an evaluation engine 110, an analysis engine 120, and a memory 130. The evaluation engine 110 includes one or more processors (e.g., the processing device 902 of FIG. 9) that execute instructions (e.g., the instructions 926 of FIG. 9) stored in a memory (e.g., the memory 130, the main memory 904 and/or the machine-readable medium 924 of FIG. 9). The evaluation engine 110 obtains a circuit design 132 from the memory 130. In another example, the evaluation engine 110 receives the circuit design 132 from another system (e.g., a system external to or part of the circuit evaluation system 100) and connected to the circuit evaluation system 100. The circuit design 132 may be received from the external system and stored within the memory 130. In another example, the circuit design 132 is received by the evaluation engine 110 directly, and the circuit design 132 is not stored in the memory 130.

The circuit design 132 includes multiple circuit elements. For example, the circuit design 132 includes clock signals, power signals, input pins (or ports), output pins (or ports), circuit blocks, logic elements, and modules (e.g., memory modules), among others.

The evaluation engine 110 determines cones of influence of the circuit design 132 based on inputs and observation points. For example, as described in greater detail in the following, the evaluation engine 110 determines cones of influence associated with diagnostic points and observation points and corresponding inputs. For example, the cones of influence may be determined using back tracing from the diagnostic or observation points to the inputs and/or forward tracing from the inputs to the diagnostic or observation points to identify components that are included within the corresponding cones of influence.

Figure 9:
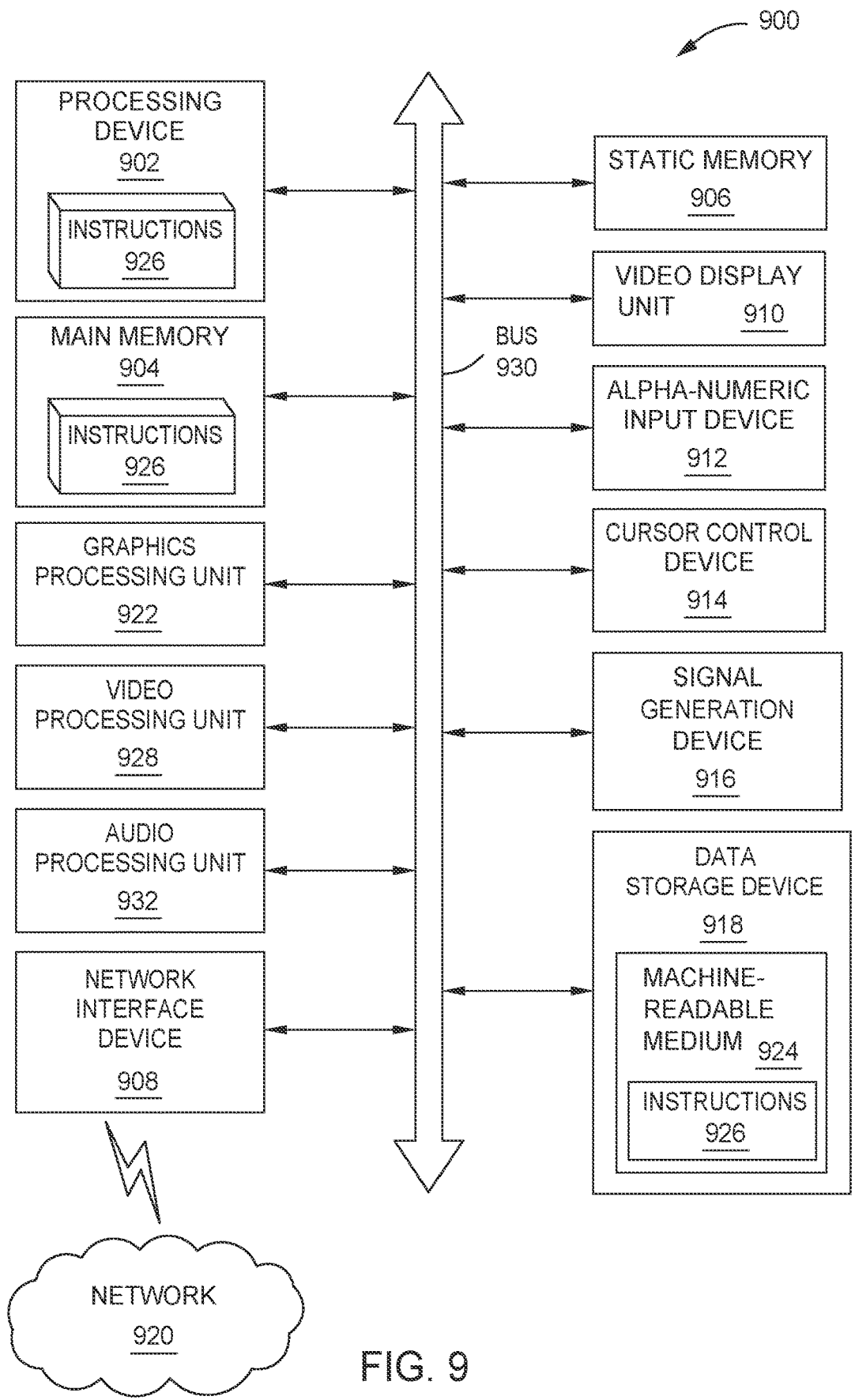
FIG. 9 depicts a diagram of an example computer system in which embodiments of the present disclosure may operate.

The analysis engine 120 includes one or more processors (e.g., the processing device 902 of FIG. 9) that execute instructions (e.g., the instructions 926 of FIG. 9) stored in a memory (e.g., the memory 130, the main memory 904 and/or the machine-readable medium 924 of FIG. 9). The analysis engine 120 evaluates cones of influence to identify faults and determine the types of the faults as will be described in greater detail in the following. Further, as will be described in greater detail in the following, the analysis engine 120 identifies a secondary, or back-up, safety circuit device or devices for a primary safety circuit device.

The memory 130 may be configured similar to that of the main memory 904 of FIG. 9 and/or the machine-readable medium 924 of FIG. 9. The memory 130 is accessible by the evaluation engine 110 and the analysis engine 120. Further, the memory 130 stores the circuit design 132.

Figure 2:
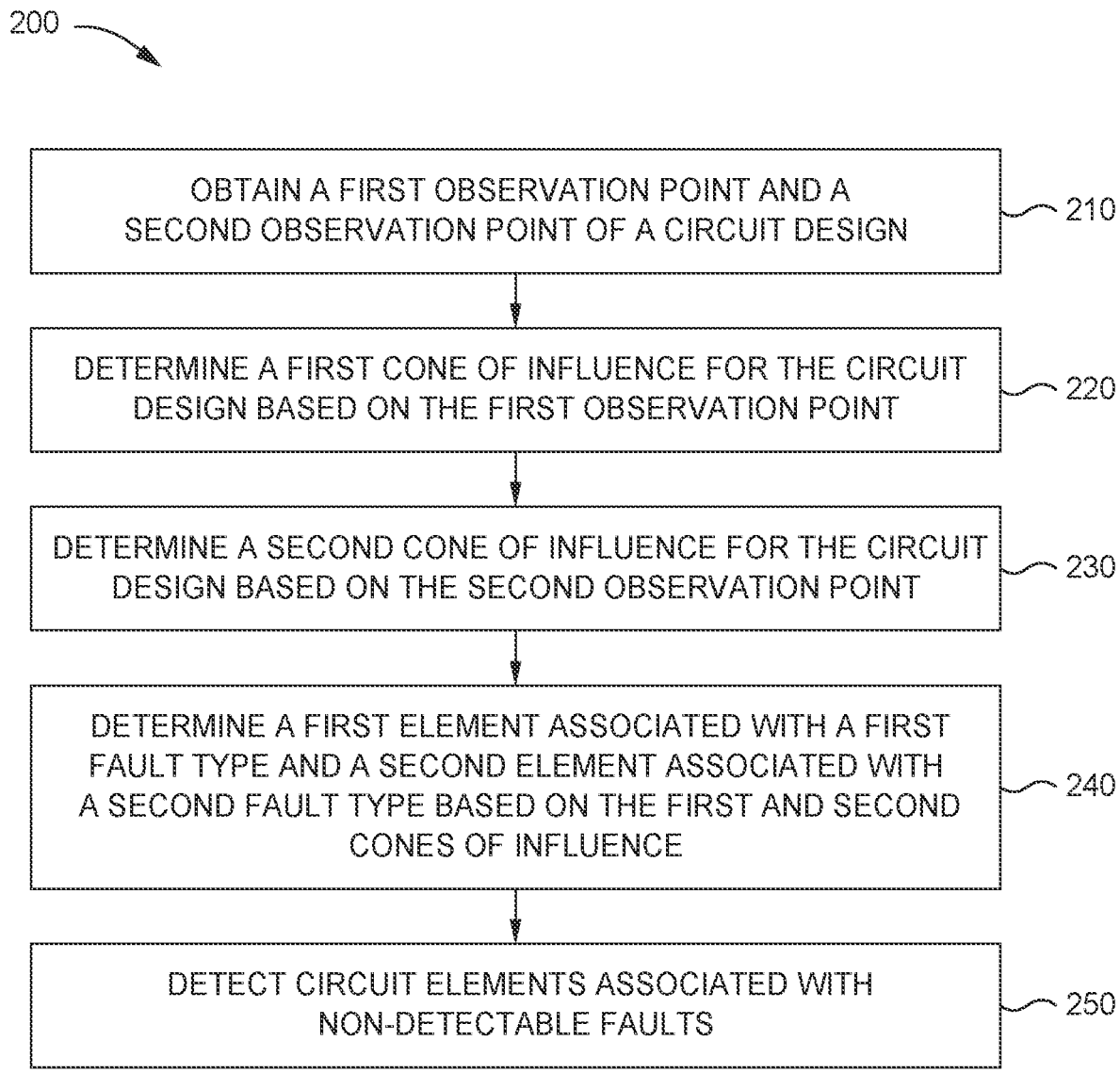
FIG. 2 depicts a flowchart of determining diagnostic coverage for a circuit device, in accordance with some embodiments of the present disclosure.

FIG. 2 illustrates a flowchart of a method 200 for detecting faults within a circuit design, according to one or more examples. The method 200 may be performed by the circuit evaluation system 100 of FIG. 1. For example, one or more processors of the circuit evaluation system 100 execute instructions stored in a memory to perform the method 200.

Figure 3:
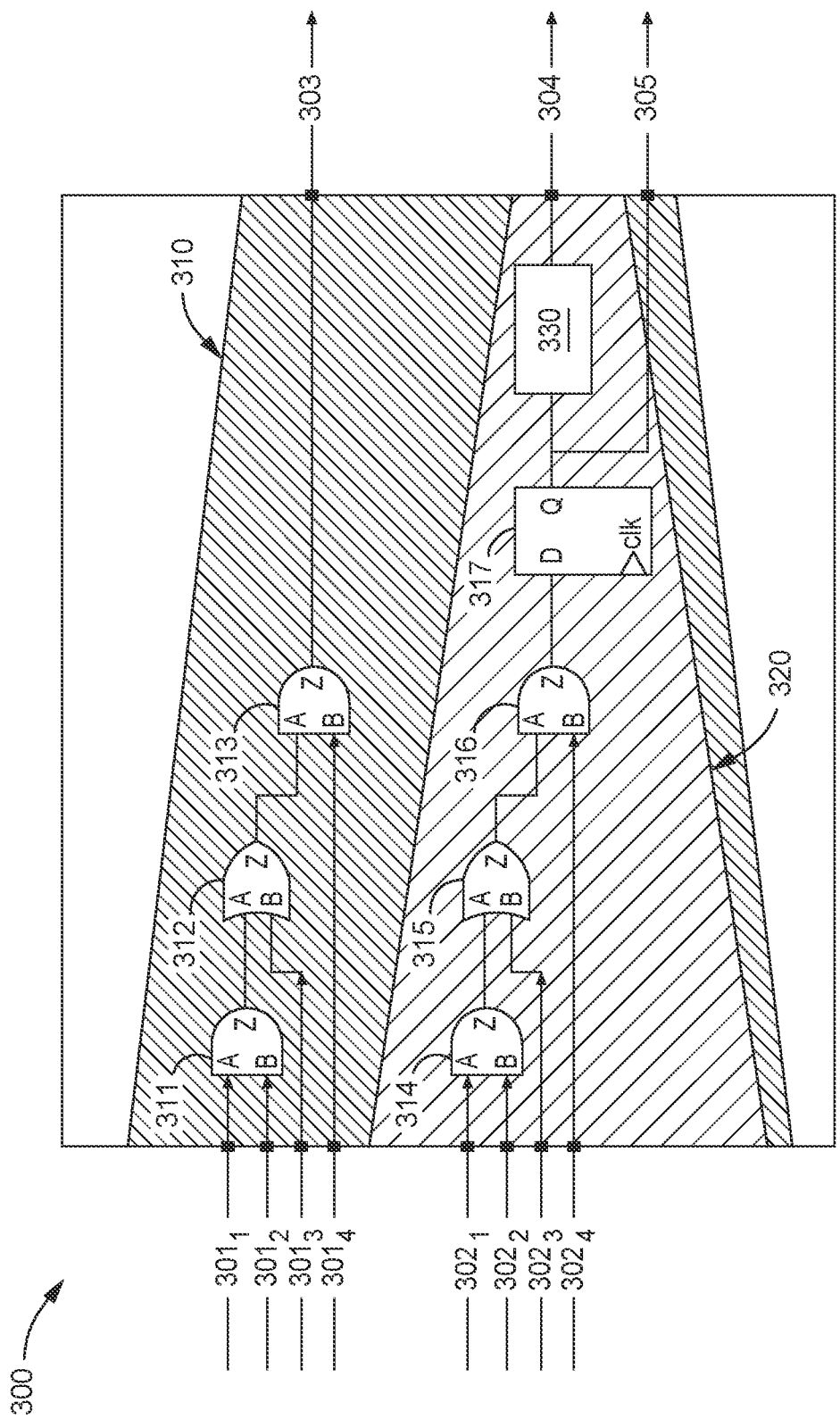
FIG. 3 depicts a circuit design showing an intersection between a cone of influence and a safety cone, in accordance with some embodiments of the present disclosure.

At 210 of the method 200, a first observation point and a second observation point of a circuit design are obtained. For example, one or more processors of the evaluation engine 110 executes instructions stored within a memory to obtain observation points of the circuit design 132 from the memory 130. FIG. 3 depicts a circuit design showing an intersection between a cone of influence and a safety cone, in accordance with some embodiments of the present disclosure. With reference to FIG. 3, the evaluation engine 110 obtains the observation points 303 and 305, and the diagnostic point 304 of a circuit design 300. In one example, a user, or designer, provides the observation points 303 and 305 and the diagnostic point 304, and stores the observation points 303 and 305 and the diagnostic point 304 within the memory 130. In one example, the circuit evaluation system 100 determines, or identifies, the observation points and diagnostic points based on the circuit elements and safety circuit devices within the circuit design 132.

At 220 of the method 200, a first cone of influence is determined for the circuit design based on the first observation point. For example, one or more processors of the evaluation engine 110 executes instructions stored within a memory to determine a first cone of influence based on a first observation point of the circuit design 132. At 230 of the method 200, a second cone of influence is determined for the circuit design based on the second observation point. For example, one or more processors of the evaluation engine 110 executes instructions stored within a memory to determine the second cone of influence based on the second observation point of the circuit design 132.

Referring to FIG. 3, a cone of influence (e.g., a cone of influence 310) is determined by back tracing the propagation path from observation points 303 and 305 to the inputs 301-302.

In one or more examples, a cone of influence is a set of cells of a circuit design that may impact one or more observation points. A cone of influence may be superimposed over a portion of a circuit design to identify cells of the circuit design that have a potential impact on a given observation point. In one or more examples, cells for a cone of influence are identified by forward-tracing through the connectivity of a circuit design along propagation paths from one or more inputs to one or more observation points. In another example, cells for a cone of influence are identified by back-tracing through the connectivity along a propagation path of a circuit design from an observation point or points to a corresponding input or inputs. In one or more examples, cells for a cone of influence are defined by back-tracing and forward tracing through the connectivity of a circuit design. One or more observation points and/or one or more inputs may be used to define a cone of influence. In one example, the observation point is an output of the block of the circuit design under evaluation. Further, one or more cells of cone of influence may be included in another cone of influence.

Throughout the following description, a cone of influence may be referred to as a cone. In one or more examples, determining (carving or tracing) a cone of influence includes identifying (e.g., tagging) the circuit elements (e.g., components) along the propagation paths between inputs and observation points. Further, determining a cone of influence includes transcending the timing hardware subpart points like flops, ports, and hierarchies along a propagation path. For example, the circuit elements and interconnecting nodes of a propagation path from an input to the observation points are identified based on the corresponding cone.

With reference to FIG. 3, the evaluation engine 110 determines the cone of influence 310 based on the observation point 303 and observation point 305 and the inputs 301-302. In one example, the evaluation engine 110 performs back tracing along the propagation paths from the observation points 303 and 305 to the inputs 301-302 to determine the cone of influence 310. In another example, the evaluation engine 110 performs forward tracing along the propagation paths from the inputs 301-302 to the observation points 303 and 305 to determine the cone of influence 310. In other examples, both back-tracing and forward-tracing are used to determine the cone of influence 310. In one example, back-tracing may be used first to determine the cone of influence 310 and forward-tracing may be used to confirm the cone of influence 310. In other examples, other combinations of back-tracing and forward-tracing can be used.

In one example, determining the cone of influence 310 identifies the circuit elements 311, 312, 313, 314, 315, 316, and 317 as being part of the cone of influence 310. The circuit elements 311-317 are components of the circuit design 300. In one example, the circuit elements 311-317 include logic gates (e.g., AND gates, OR gates, XOR gate, and NAND gates among others), and flip-flops. The cone of influence 310 is a first failure mode. The nodes within the circuit elements 311-317, i.e., nodes A, B, Z or D, Q, clk, can be identified as the faults within this first failure mode cone. These faults may be referred to as detectable dangerous faults within the first failure mode cone.

With further reference to FIG. 3, the cone of influence 320 is determined based on the diagnostic point 304 and the inputs 302. The diagnostic point 304 is the output of the safety circuit device 330. The cone of influence 320 includes the propagation path from the diagnostic point 304 to the inputs 302. Further, the cone of influence 320 includes the circuit elements 314, 315, 316, and 317, which are along the propagation path between the diagnostic point 304 and the inputs 302. The cone of influence 320 may be referred to as a safety cone or a safety cone of influence. The nodes within the circuit elements 314-317, i.e., nodes A, B, Z or D, Q, clk, can be identified as the faults within this first failure mode cone. These faults may be referred to as dangerous detectable faults within the safety cone. In one example, the evaluation engine 110 performs back-tracing along the propagation path or paths from the diagnostic point 304 to the inputs 302 to determine the cone of influence 320. In another example, the evaluation engine 110 performs forward-tracing along the propagation path or paths from the inputs 302 to the diagnostic points 304 to determine the cone of influence 320. In other examples, both back-tracing and forward-tracing are used to determine the cone of influence 320. In one example, forward tracing may be pursued without consideration of timing points like ports, flops, and hierarchies to check feasibility in reaching to the input of the safety circuit device. Such a static analysis may avoid the need to run effort-intensive fault simulations. In one or more examples, if the path between an element and the safety circuit device 330 is feasible (e.g., a path exists between the element and the safety circuit device 330), a fault along that path is considered to be detectable by the safety circuit device 330 and is identified as dangerous detectable fault.

With further reference to FIG. 2, at 240 of the method 200, a first component associated with a first fault type and a second component associated with a second fault type are determined based on the first and second cones of influence. For example, one or more processors of the analysis engine 120 executes instructions stored within a memory to determine a first component associated with a first fault of the first fault type and a second element associated with a second fault of the second fault type based on the first and second cones of influence. The fault types include dangerous fault types, non-dangerous fault types, latent detectable fault types, and latent-undetectable fault types. With reference to FIG. 3, the analysis engine 120 determines that the circuit elements 311-313 are dangerous undetectable faults associated with single point faults (SPFs) and that the circuit elements 314-317 are dangerous detectable faults. A single point fault is a hardware fault in an element that leads directly to the violation of a safety goal and that fault is not detectable by any safety circuit device.

For example, the analysis engine 120 determines that the circuit elements 311-313 in FIG. 3 are not associated with a safety circuit device based on the comparison of the cone of influence 310 and the cone of influence 320. The analysis engine 120 determines that the circuit elements 311-313 are not included within the cone of influence 320 associated with the safety circuit device 330 or any other safety circuit device. Accordingly, faults occurring within the circuit elements 311-313 are determined to be not detected by a safety circuit device and such faults may be referred to as single point faults.

Further, the analysis engine 120 determines that the circuit elements 314-317 in FIG. 3 are part of the cone of influence 320 associated with the safety circuit device 330 based on the cone of influence 310 and/or the cone of influence 320. The analysis engine 120 determines that the circuit elements 314-317 are included within the cone of influence 320 associated with the safety circuit device 330. Accordingly, faults that occur within the circuit elements 314-317 are detected by the safety circuit device 330. Such faults may be referred to as dangerous detectable faults.

Figure 7:
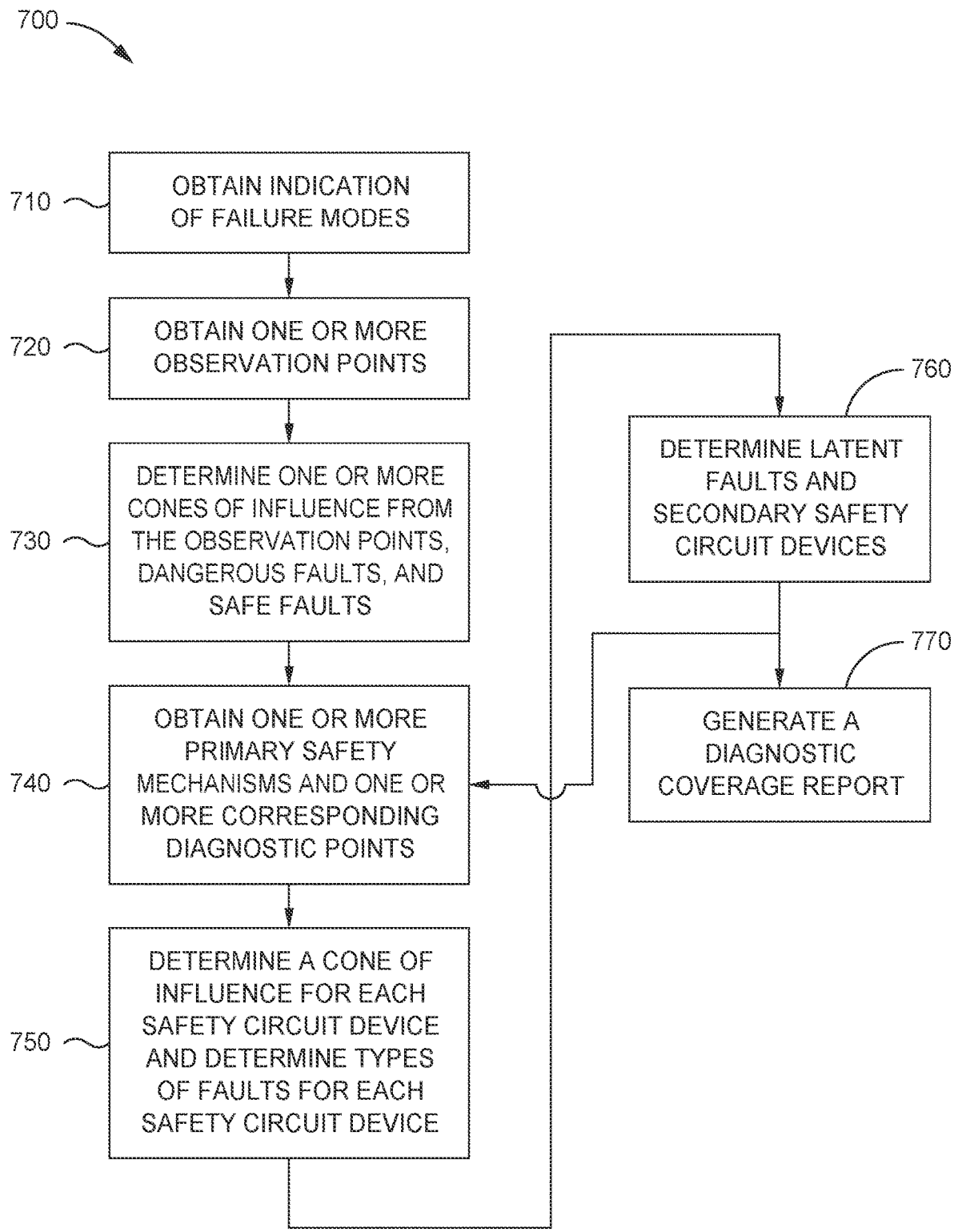
FIG. 7 depicts a flowchart of determining diagnostic coverage for a circuit device, in accordance with some embodiments of the present disclosure.

In one example, 240 of the method 200 may further include determining whether or not a circuit element is associated with redundant safety circuit devices as described with regard to the method 700 of FIG. 7.

The method 200 of FIG. 2 describes a process performed by the circuit evaluation system 100 which addresses the limitations of current processes for evaluating and analyzing circuit designs. As compared to current processes for evaluating and analyzing circuit designs, the process of method 200 determines design data based on a structural analysis. The method 200 is performed by the circuit evaluation system 100 to determine a quantitative analysis of the diagnostic coverage for single point faults, and latent faults. In one or more examples, for elements that are associated with latent faults, the circuit evaluation system 100 identifies secondary (e.g., backup) safety circuit devices that may be used as a backup for a primary safety circuit device. Further, the quantitative result obtained as disclosed herein may provide evidence of analysis for industry-standard for safety at the higher levels of ASIL.

With further reference to FIG. 3, in one example, the cone of influence 310 is associated with a first failure mode. The nodes of the cell (e.g., circuit elements) within the cone of influence 310 are the fault locations within the failure mode of the cone of influence 310. In some embodiments, unique fault locations can be pruned by identifying only the source or destination of a fault and not double-counting the source and destination of fault propagation. Fault pruning may be used to avoid double counting. For example, the output of the circuit element 311 (e.g., node Z) and the input of the circuit element 312 (e.g., node A) are connected by a wire (e.g., a trace). Accordingly, the output of the circuit element 311 and the corresponding input of the circuit element 312 are effectively the same connected by a wire. A fault occurring in either of the output of the circuit element 311 or the corresponding circuit element 312 will occur at the observation point 303. According, a fault occurring at one of the output of the circuit element 311 or the corresponding input of the circuit element 312 may be pruned. Pruning the faults avoids false counting that may negatively influence the diagnostic coverage of the circuit design 300. The diagnostic coverage is a measure of the detectability of a fault with respect to the safety circuit device or devices (e.g., the safety circuit device 330). Duplicate faults that are included within the diagnostic coverage may result in an incorrectly determined diagnostic coverage.

Figure 4:
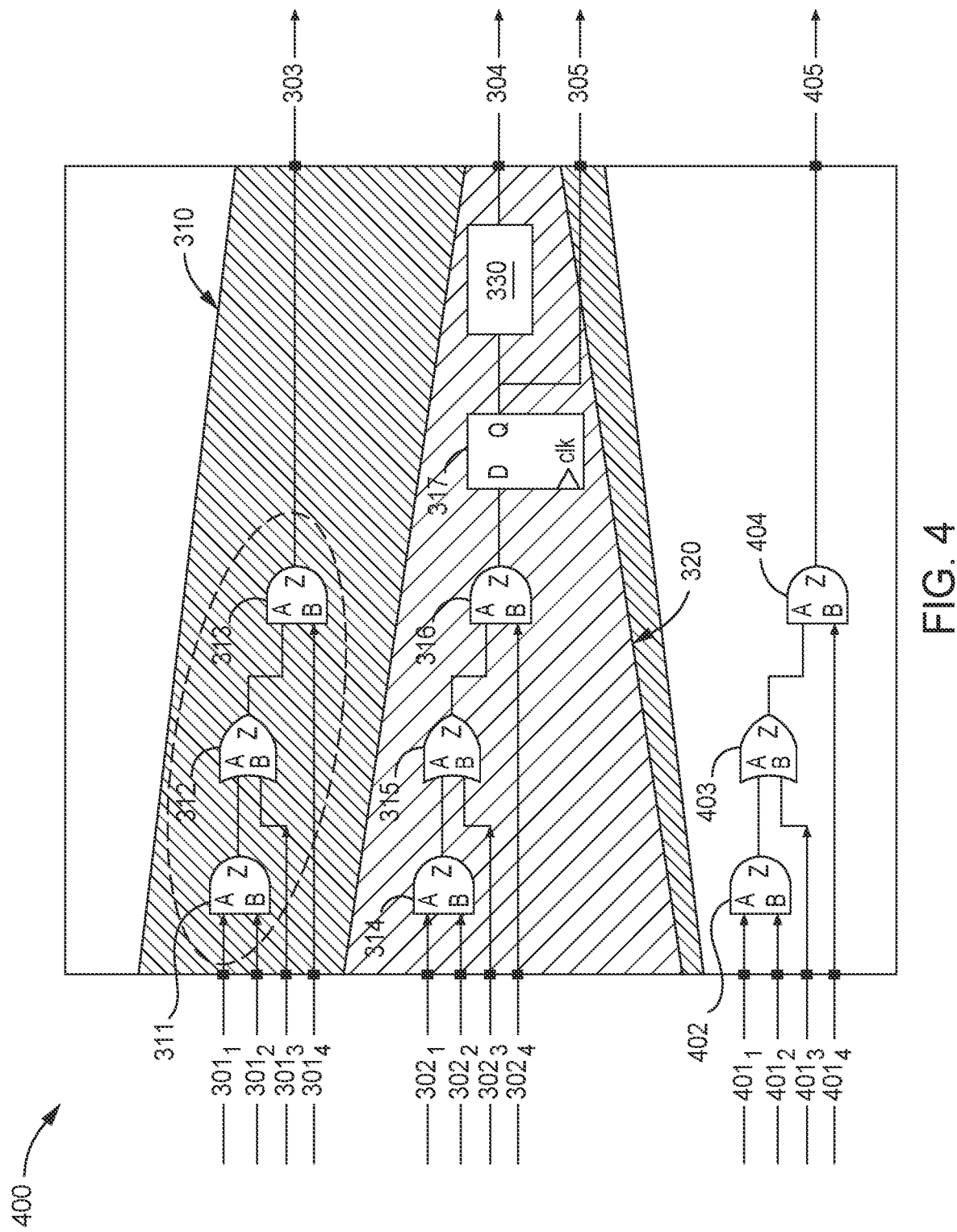
FIG. 4 depicts another circuit design showing an intersection between a cone of influence and a safety cone, in accordance with some embodiments of the present disclosure.

FIG. 4 depicts another circuit design showing an intersection between a cone of influence and a safety cone, in accordance with some embodiments of the present disclosure. A circuit design 400 includes the circuit elements of the circuit design 300 and circuit elements 402-404. The cone of influence 310 and the cone of influence 320 are determined as described above with regard to FIG. 3. As is noted above with regard to the description of FIG. 3, the cone of influence 320 is a subset of the cone of influence 310. Further, as is described above, based on the intersection of the cone of influence 310 and the cone of influence 320, different types of faults may be determined. In one example, faults that may occur within the intersection between the cone of influence 310 and the cone of influence 320 are detectable by the safety circuit device 330. For example, as is described above, faults associated with circuit elements 314-317 are detectable by the safety circuit device 330. Further, faults associated with circuit elements that are not included in the cone of influence 320 are not detectable by the safety circuit device 330 and are single point faults. For example, faults associated with the circuit elements 311-313 are not detectable by the safety circuit device 330 and are referred to as single point faults.

In one example, with further reference to FIG. 2, at 250 of the method 200, circuit elements associated with none of the failure modes are determined. For example, with reference to FIG. 4, circuit elements that are outside the cone of influence 310 are associated with non-detectable faults. A difference between the circuit elements within the cone of influence 310 and the total circuit elements within the circuit design 300 may be determined. Determining the difference between the circuit elements within the cone of influence 310 and the total circuit elements within the circuit design 300 determines the circuit elements that are outside the cone of influence 310. For example, the circuit elements 402-404 are determined to be outside the cone of influence 310.

The circuit elements 402-404 are coupled between the inputs 401 and the output port 405. The circuit elements 402-404 are not included within the cone of influence 310 or the cone of influence 320. Accordingly, the faults associated with the circuit elements 402-404 are not in any failure mode cone. Accordingly, the circuit elements 402-404 are non-safety related (NSR) logic. Determining that the circuit elements 402-404 are non-safety related logic includes identifying all the circuit elements (e.g., logic) in a block that are not part of any failure mode cone. In FIG. 4, the observation points 303 and 305 constitute the circuit elements in the cone of influence (e.g., a failure mode cone) 310. The circuit elements within the failure mode cone 310 is the safety related logic in circuit design 400. The circuit elements along the propagation path between inputs 401 and the output port 405, e.g., circuit elements 402-404, are associated with non-dangerous faults. The non-dangerous faults may be called safe faults. Accordingly, the circuit elements 402-404 may be referred to as non-safety related (NSR) logic. Further, the faults associated with the circuit elements 402-404 are determined to be safe faults that do not violate any safety goals of the circuit design 400. For example, the faults associated with the circuit elements 402-404 do not negatively affect the transmission and/or receipt of signals.

Thus, by collecting all the fault locations within the cone of influence 310 and the cone of influence 320, the diagnostic coverage of the corresponding failure mode within the circuit design can be achieved in less time and/or by using less processing resources as compared to other methods for determining the diagnostic coverage of the circuit design. In one or more example, determining the diagnostic coverage result in yielding the single point fault metric (SPFM) as one of the metrics for deducing the ASIL.

Figure 5:
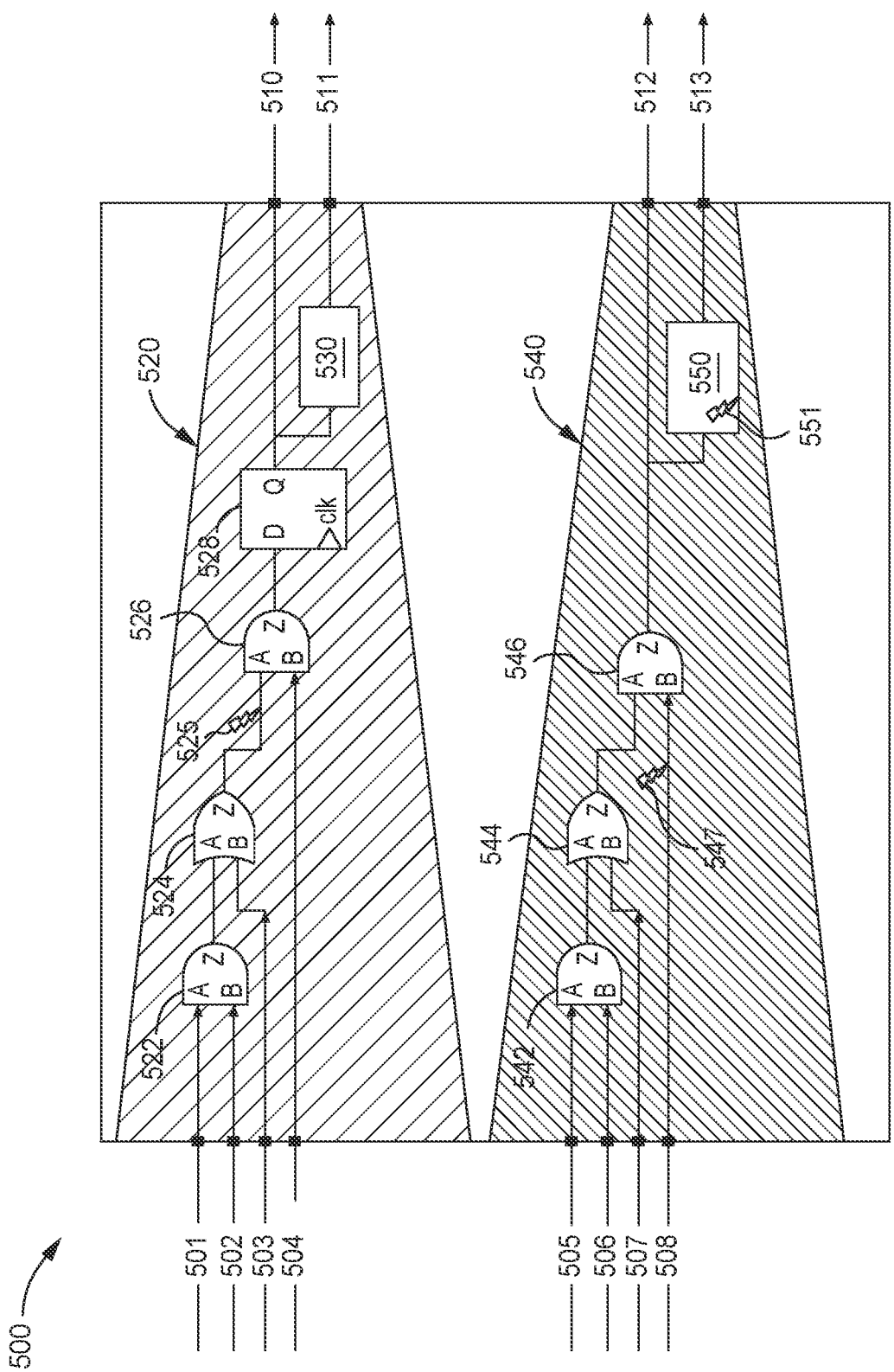
FIG. 5 depicts a circuit design showing two safety cones, in accordance with some embodiments of the present disclosure.

FIG. 5 depicts a circuit design 500 showing two safety cones, in accordance with some embodiments of the present disclosure. In FIG. 5, the circuit design 500 includes inputs 501-508 and observation points 510 and 512. The circuit design 500 further includes circuit elements 522-528, circuit elements 542-546, safety circuit device 530, and safety circuit device 550. The outputs 511 and 513 are diagnostic points as the outputs 511 and 513 are the outputs of safety circuit devices 530 and 550, respectively. The cone of influence 520 corresponds to the propagation path between the observation point 510 and the inputs 501-504. Further, the cone of influence 520 corresponds to the propagation path between the diagnostic point 511 and the inputs 501-504.

The cone of influence 540 corresponds to the propagation path between the observation point 512 and the inputs 505-508. Further, the cone of influence 540 corresponds to the propagation path between the diagnostic point 513 and the inputs 505-508.

The safety circuit device 530 determines the diagnostic coverage for the cone of influence 520. Accordingly, faults that are associated with the circuit elements 522-528 are detected by the safety circuit device 530. The cone of influence 520 is associated with a corresponding failure mode cone in which failures that occur may be detected by the safety circuit device 530. The failure mode cone of the safety circuit device 530 overlaps with the cone of influence 520.

The safety circuit device 550 determines the diagnostic coverage for the cone of influence 540. Accordingly, faults that are associated with the circuit elements 542-546 are detected by the safety circuit device 550. Further, the cone of influence 540 is associated with a corresponding failure mode cone in which failures that occur may be detected by the safety circuit device 550. The failure mode cone of the safety circuit device 550 overlaps with the cone of influence 540.

In one or more examples, faults may occur within the safety circuit devices 530 and 550. In an example when the safety circuit device 530 is fault free, all the circuit elements (e.g., cells) in the cone of influence 520, e.g., elements 522-528, are detectable by the safety circuit device 530 at the diagnostic point 511. Accordingly, the diagnostic coverage associated with the cone of influence 520 is 100 percent, as 100 percent of the faults that occur with regard to the circuit elements 522-528 may be detected, when faults do not occur within the safety circuit device 550. For example, the fault 525 is detectable by the safety circuit device 530. Further, in an example when the safety circuit device 550 is fault free, all the circuit elements (e.g., cells) in the cone of influence 540, e.g., elements 542-546, are detectable by the safety circuit device 550 at the diagnostic point 513. Accordingly, the diagnostic coverage associated with the cone of influence 540 is 100 percent, as 100 percent of the faults that occur with regard to the circuit elements 542-546 may be detected, when faults do not occur within the safety circuit device 550.

In the example where a fault occurs within the safety circuit devices 530 or 550, the safety circuit device 530 or 550 is unable to detect a fault that occurs within the respective cone of influence, e.g., the cone of influence 520 or the cone of influence 540. For example, as illustrated in FIG. 5, the fault 551 occurs within the safety circuit device 550. Accordingly, a fault, e.g. the fault 547 that occurs within the cone of influence 540 is not detected by the safety circuit device 550. In such an example, the fault 547 can cause a safety goal violation at the observation point 512. Thus, the fault 547 becomes a latent fault.

A diagnostic coverage, e.g., a latent fault metric (LFM) or other metric, of the circuit design 500 may have a relatively low value as a failure within the safety circuit device 530 and/or 550 may lead to faults not being detected. In one example, the diagnostic coverage corresponds to the number of faults that are detected with reference to the total number of faults. A low value of diagnostic coverage corresponds to low number of faults that are detected. Typically, a diagnostic coverage less than about 50% is considered low. However, if a redundant safety circuit device is used in conjunction with the safety circuit device 530 and/or 550, the LFM value is increased. Redundant safety circuit devices may be used to mitigate failures that occur within the safety circuit device 530 and/or the safety circuit device 550, increasing the diagnostic coverage of the corresponding circuit design 500.

Figure 6:
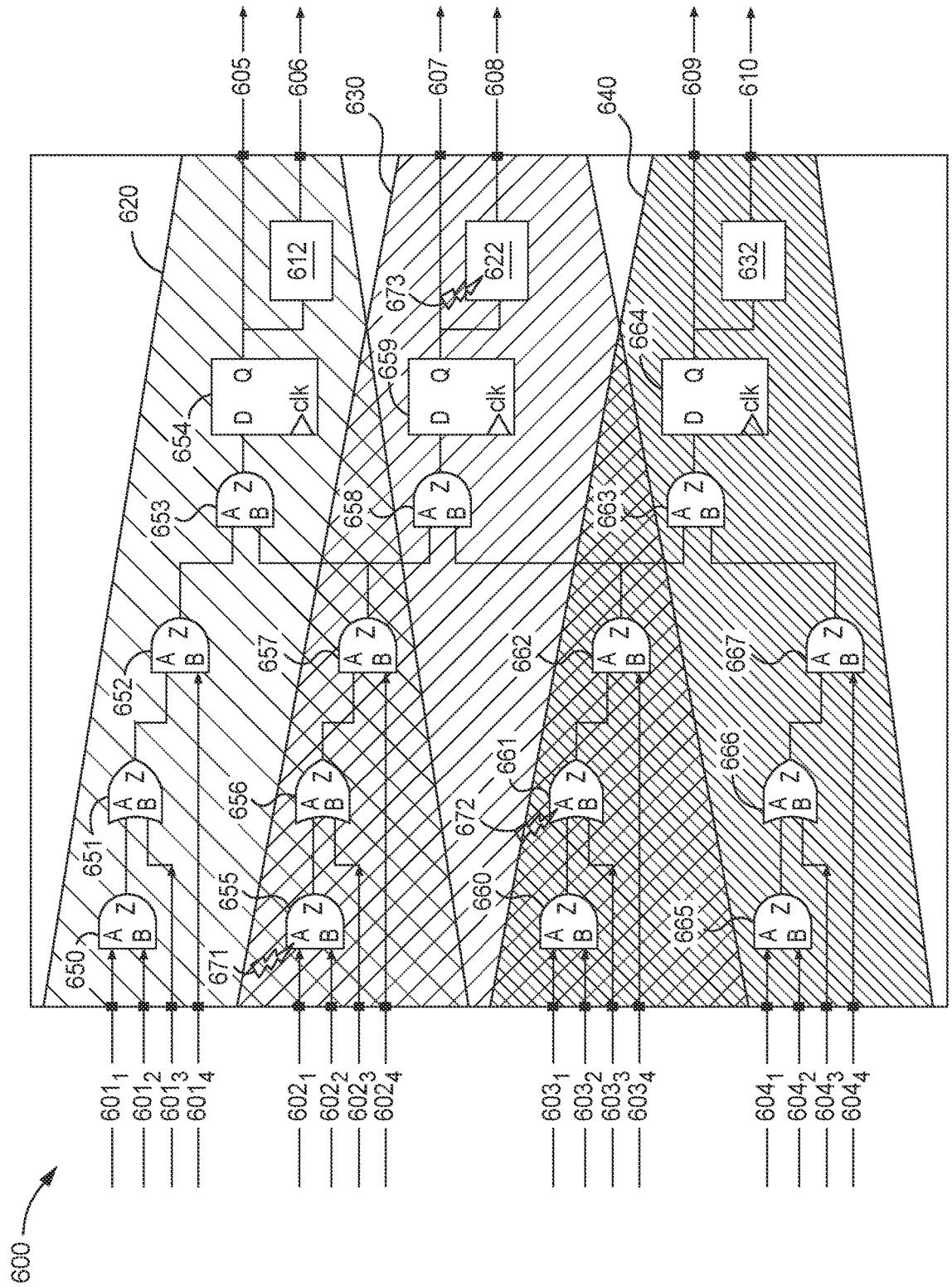
FIG. 6 depicts a circuit design showing intersection between safety cones, in accordance with some embodiments of the present disclosure.

FIG. 6 depicts a circuit design showing intersection between safety cones, in accordance with some embodiments of the present disclosure. A circuit design 600 includes inputs 601, 602, 603, and 604 and observation points 605-610, circuit elements 650-664, and safety circuit devices 612, 622, and 632. As is described in further detail in the following, one or more of the safety circuit devices 612, 622, and 632 may function as a redundant safety circuit device for another one or more of the safety circuit devices 612, 622, and 632.

In one or more examples, a circuit design with redundant safety circuit devices may be configured such that safety circuit devices for one failure mode may serve as secondary safety circuit devices for adjacent failure modes. Each failure mode is then associated with more than one safety circuit device. Such an architecture with redundant safety circuit devices serve to mitigate the latent faults should the primary safety circuit device fail. Analysis of such redundant safety circuit devices may be performed according to certain embodiments.

Redundant safety circuit devices may be used to detect faults for a circuit element when a fault occurs within the primary safety circuit device. For example, when a fault occurs in the safety circuit device 622 (e.g., fault 673), the safety circuit device 622 is not able to detect faults that occur in the circuit elements electrically coupled to the safety circuit device 622, e.g., circuit elements 655-662. For example, based on the fault 673, the safety circuit device 622 is not able to detect the fault 671 that occurs within the circuit element 655. However, the circuit element 655 is additionally electrically coupled to the safety circuit device 612. Accordingly, the safety circuit device 612 functions as a redundant safety circuit device for the circuit element 655, and may be used to detect the fault 671 at the circuit element 655. If the fault 671 is not detected by the safety circuit device 612, the fault 671 is a latent fault. Accordingly, the diagnostic coverage of the corresponding circuit design 600 may be reduced. However, by using the safety circuit device 612 as a redundant safety circuit device, the fault 671 is detectable, thus mitigating the reduced diagnostic coverage of the circuit design 600.

The circuit design 600 includes three failure modes, each associated with a respective one of the safety circuit devices 612, 622, and 632, and related cones of influence 620, 630, and 640. The cone of influence 620 corresponds to a first failure mode, the cone of influence 630 corresponds to a second failure mode, and the cone of influence 640 corresponds to a third failure mode. The evaluation engine 110 determines the cones of influence 620, 630, and 640 based on the observation points 605-610. The observation points 605-610 may be defined by a user or determined based on the circuit elements 650-664, and/or the safety circuit devices 612, 622, and 632. The cones of influence 620, 630, and 640 are determined by back tracing from the observation points 605, 607, and 609 to the inputs 601-604 and/or forward tracing from the inputs 601-604 to the observation points 605, 607, and 609. Each failure mode is associated with a respective one of the safety circuit devices 612, 622, and 632. Further, each of the safety circuit devices 612, 622, and 632 are associated with a safety cone that overlaps with a respective one of the cones of influence 620, 630, and 640. In one or more examples, one or more of the safety cones partially overlaps with a respective cone of influence (e.g., as illustrated by the cones of influence 310 and 320 of FIG. 3). The safety cone of the safety circuit device 612 is determined by back tracing from the diagnostic point 606 to the inputs 601-602, and/or forward tracing from the inputs 601-602 to the diagnostic point 606. The safety cone of the safety circuit device 612 overlaps with the cone of influence 620. The safety cone of the safety circuit device 622 is determined by back tracing from the diagnostic point 608 to the inputs 602-603, and/or forward tracing from the inputs 602-603 to the diagnostic point 608. The safety cone of the safety circuit device 632 overlaps with the cone of influence 640. The safety cone of the safety circuit device 632 is determined by back tracing from the diagnostic point 610 to the inputs 603-604, and/or forward tracing from the inputs 603-604 to the diagnostic point 610. The safety cone of the safety circuit device 632 overlaps with the cone of influence 640. As the safety cones of the safety circuit devices 612, 622, and 632 completely overlap with a respective one of the cones of influence 620, 630, and 640, when referring to FIG. 6, the terms cones of influence and safety cones may be used interchangeably.

The circuit elements 655-657 are included within both the cones of influence 620 and 630, further the circuit elements 660-662 are included within both of the cones of influence 640 and 630. Accordingly, faults occurring within the circuit elements 655-657 can be detected by the safety circuit device 612 and the safety circuit device 622. Further, faults occurring within the circuit elements 660-662 can be detected by the safety circuit device 622 and the safety circuit device 632. In one example, the safety circuit device 622 is the user, or design, intended primary safety circuit device for the circuit elements 655-657, and the safety circuit device 612 is the secondary safety circuit device (or redundant safety circuit device) for the circuit elements 655-657. Accordingly, when a fault occurs within the safety circuit device 622, faults that occur within the circuit elements 655-657 may be detected by the safety circuit device 612. The safety circuit device 622 is the primary safety circuit device for the circuit elements 660-662, and the safety circuit device 632 is the secondary safety circuit device for the circuit elements 660-662. Accordingly, when a fault occurs within the safety circuit device 632, faults that occur within the circuit elements 660-662 can be detected by the safety circuit device 622. The faults in circuit elements 655-657 may be referred to as latent detectable faults. In one example, a designer or user, an engine within the circuit evaluation system 100, or an external processing system indicates which of the safety circuit devices is a primary safety circuit device and the corresponding circuit elements.

The circuit elements 650-654 are electrically connected to the safety circuit device 612 and are not electrically connected to a secondary safety circuit device. Accordingly, when a fault occurs within the safety circuit device 612, faults occurring within the circuit elements 650-654 become latent faults and are not detected. The circuit elements 658-659 are electrically connected to the safety circuit device 622 and are not electrically connected to a secondary safety circuit device. Accordingly, when a fault occurs within the safety circuit device 622 (e.g., fault 673), faults occurring within the circuit elements 658-659 become latent faults and are not detected and may be referred to as latent undetectable faults. The circuit elements 663-667 are electrically connected to the safety circuit device 632, and are not electrically connected to a secondary safety circuit device. Accordingly, when a fault occurs within the safety circuit device 632, faults occurring within the circuit elements 663-667 become latent faults and are not detected.

In one or more examples, the intersection (e.g., region of overlap) of safety cones of the safety circuit devices (e.g., safety circuit device 612, 622, and 632) may be designed and subsequently analyzed in order to obtain and properly analyze sufficient mitigating overlap. By determining the intersection of the safety cones corresponding to two or more safety circuit devices, the redundancy between the two or more safety circuit devices, is used in the detection of faults, should the intended safety circuit device fail. In other examples, the detectability of a fault in the primary safety circuit device to the diagnostic coverage of another safety mechanism cone can be confirmed through forward path tracing.

In one or more examples, the information of the diagnostic coverage of faults detectable and undetectable by primary and secondary safety circuit devices and the mapping of the fault detectability to the primary and secondary safety circuit devices is stored as a data file within the memory 130. In other example, the information of the diagnostic coverage of faults detectable and undetectable by primary and secondary safety circuit devices and the mapping of the fault detectability to the primary and secondary safety circuit devices is output to a processing system connected to the circuit evaluation system 100. In one example, the information of the diagnostic coverage of faults detectable and undetectable by primary and secondary safety circuit devices and the mapping of the fault detectability to the primary and secondary safety circuit devices is be used in preparing the FMEDA for the circuit device 600.

In one or more examples, circuit elements that are included in the safety cone of two or more safety circuit devices may be determined through the use of back tracing and/or forwarding tracing. Accordingly, faults may be determined to be safe faults, undetectable dangerous faults (e.g., single point faults), and dangerous faults undetectable when the safety circuit device becomes faulty (e.g., latent faults) depending on whether or not a redundant safety circuit device is available. To determine whether or not a redundant circuit device is available, the analysis engine 120 analyses the safety cones to determine overlapping regions between the safety cones. Further, the faults within the safety cones are segregated to determine whether or not redundant safety circuit devices are available for the faults.

In one or more examples, the evaluation engine 110 obtains observation points for the circuit design 132 stored within the memory 130. Further, the evaluation engine 110 obtains the safety circuit devices and location of the safety circuit devices from the memory 130. The observation points may be provided by a designer or user, another processing system, or other engine of the circuit evaluation system 100. Further, the safety circuit devices may be provided by a designer or user, another processing system, or other engine of the circuit evaluation system 100. The observation points include the diagnostic points of safety circuit devices. The evaluation engine 110 performs back tracing from the observation points to corresponding inputs to determine cone of influence and corresponding circuit elements that are within each cone of influence. In one example, determining the cones of influence transcends the timing hardware of the circuit elements (e.g., flip flop circuit elements, ports, and sub-hierarchies). In one example, the analysis engine 120 identifies the intersection between the safety cones of the safety circuit devices. For example, the analysis engine 120 determines if there are two or more cones of influence. Based on there being two or more cones of influence, the analysis engine 120 determines the intersection region between the cones. Further, the analysis engine 120 identifies faults that are detectable by a primary and secondary safety circuit device, and faults that are undetectable by a primary and secondary safety circuit device. Further, the primary safety circuit devices may be provided by a designer or user, another processing system, or other engine of the circuit evaluation system 100. The analysis engine 120 saves the detectable and undetectable faults within the memory 130. For example, the analysis engine 120 generates a file that includes the detectable and undetectable faults and stores the file within the memory 130. In another example, the file including the detectable and undetectable faults is output to another engine of the circuit evaluation system 100 or to a processing system connected to the circuit evaluation system 100.

FIG. 7 illustrates a flowchart of a method 700 for determining the diagnostic coverage for a circuit device, according to one or more examples. The method 700 may be performed by the circuit evaluation system 100. For example, one or more processors of the circuit evaluation system 100 executes instructions stored in a memory to perform the method 700.

In one example, performing the method 700 performs an analysis of safety logic, using cones of influence and safety cones, and intersections between the cones to identify the types of faults (e.g., safe faults, single point faults, and latent faults) in each failure mode. Each failure mode includes a corresponding primary safety circuit device that detect the faults in each failure mode cone. Further, each failure mode includes an associated secondary safety circuit device that is able to detect fault when a failure occurs within a primary safety device is evaluated by one or more processors of the circuit evaluation system 100.

At 710, an indication of the failure mode is obtained. For example, the evaluation engine 110 obtains an indication of the failure mode. The indication of the failure mode may be obtained from the memory 130, another element within the circuit evaluation system 100, or a system external to the circuit evaluation system 100. In one example, the indication of the failure mode is provided by a designer or user. In one example, the indication of a failure mode is provided after a designer, an engine of the circuit evaluation system 100, or another processing system performs a safety analysis on the corresponding circuit design (e.g., the circuit design 600). In one example, non-limiting examples of safety analyses include DFMEA and the Fault Tree Analysis (FTA) of the safety-related logic of the circuit design. In one example, a DFMEA involves a qualitative analysis including the steps of determining failure modes and failure mode effects. Failure modes are determined by identifying hardware subpart or subparts in the circuit design that are that are susceptible to random hardware faults, that if undetected can lead to a failure. Failure mode effects are a brief description of what the effects of the failure mode on the hardware subpart would be.

Failure modes and failure mode effects are determined in preparation for a DFMEA or FMEDA of the safety-related circuit elements (e.g., safety circuit devices). For example, a failure mode is the cone of influence 520 and the cone of influence 540 of FIG. 5. In one or more examples, the number of failure modes within a circuit design is two or more. Further, the number of safety circuit devices within a circuit design corresponds to the number of failure modes which is one or more.

At 720 of the method 700, one or more observation points are received. For example, the evaluation engine 110 receives one or more observation points from the memory 130. In other examples, one or more observation points are received from another engine of the circuit evaluation system 100 or a processing system connected to the circuit evaluation system 100. The observation points correspond to the failure mode or modes. Each observation point corresponds to one or more failure modes. The observation points are output ports of the portion of the circuit design where the failure effect is detectable (or observable). These observation points are identified during the analysis of each failure mode. In one or more examples, there can be more than one observation point per failure mode. For example, with reference to FIG. 6, the observation point 605 is identified for a first failure mode and observation point 607 is identified for a second failure mode.

At 730, cones of influence for each failure mode are determined. For example, the evaluation engine 110 determines a cone of influence for each failure mode. The cones of influence may be used to determine faults and the types of faults (e.g., safe or dangerous faults). In one example, the evaluation engine 110 performs back tracing from an observation point of a failure mode to the corresponding input or inputs to determine a cone of influence for the failure mode. In another examples, forward tracing may be used alternatively to, or in addition to, back tracing to determine the cone of influence. The back and/or forward tracing continues beyond any intermediate timing stop points like flip-flop circuits or ports of any subhierarchies within the cone. In one example, identifying a cone of influence includes identifying all the fault locations within that cone of influence. Fault locations are typically the outputs pin of the circuit elements (e.g., gates or flops) within the cone of influence.

For example, with regard to FIG. 5, the cones of influence 520 is determined based on the observation point 510 and corresponds to a first failure mode and the cone of influence 540 is determined based on the observation point 512. With reference to FIG. 6, the cones of influence 620, 630, and 640 are determined based on the observation points 605, 607, and 609, respectively. Each of the cones of influence 620, 630, and 640 corresponds to a different failure mode.

Further, at 730 of FIG. 7, dangerous faults and safe faults are determined. Dangerous faults are faults that are observable at an observation point of a failure mode. Safe faults are faults that are not part of a failure mode. With reference to FIG. 4, dangerous faults are associated with circuit elements 311-313, which are associated with the failure mode of the cone of influence 310, and safe faults are associated with circuit elements 402-403, which are not associated with any failure modes. In one or more examples, dangerous faults are a collection of all unique faults from all failure mode cones in a circuit design. At 730 of the method 700, the dangerous faults have not been determined to be detectable or not a safety circuit device. The number of safe faults is equal to the difference between the number of all faults and the number of faults within the failure modes. For example, with reference to FIG. 4, the number of safe faults is the number of total faults (e.g., ten total faults) minus the number of faults of the failure mode of the cone of influence 310 (e.g., seven total faults). Accordingly, the number of safe faults in FIG. 4 is three (e.g., the faults associated with the circuit elements 402, 403, and 404, which are outside the cone of influence 310). As the faults associated with the circuit elements 402, 403, and 404 not involved in any failure mode cone, the faults do not violate any safety goals and are considered safe faults.

At 740 of the method 700, one or more safety circuit devices and one or more corresponding diagnostic points are obtained. The safety circuit intended to be the primary safety circuit for a failure mode is also designated. For example, the evaluation engine 110 obtains one or more primary safety circuit devices and/or one or more corresponding diagnostic points from the memory 130, another engine within the circuit evaluation system 100, and/or processing system connected to the circuit evaluation system 100. In one example, the primary safety circuit devices and diagnostic points are provided based on the failure mode and failure mode effects. The provided primary safety circuit device is able to detect and indicate faults occurring within the corresponding cone of influence. The diagnostic point is the output port of the safety circuit device and indicates the fault detection. In one example, each safety circuit device has a diagnostic point. In another example, a safety circuit device has more than one diagnostic point. In one or more examples, each failure mode is associated with a safety circuit device. In another example, each failure mode is associated with more than one safety circuit device. A circuit design having a relatively high diagnostic coverage value (e.g., a diagnostic value of about 99 percent) has at least one primary safety circuit device for each failure mode. Each safety circuit device and corresponding diagnostic point are specified by a designer, an engine within the circuit evaluation system 100, or a system connected to the circuit evaluation system. For example, with reference to FIG. 5, the safety circuit device 530 and diagnostic point 511 are determined for the cone of influence 520, and the safety circuit device 550 and diagnostic point 513 are determined for the cone of influence 540. In various examples, each cone of influence may be associated with more than one safety circuit device and diagnostic point.

At 750 of the method 700, a cone of influence and the types of faults for each safety circuit device are determined. In one example, the evaluation engine 110 determines the cone of influence for each safety circuit device and the analysis engine 120 determines the type of each fault. The evaluation engine 110 employs back tracing, forward tracing, or a combination of both based on the diagnostic points and the inputs to determine the cones of influence for each safety circuit device. In one or more example, circuit elements may be included in more than one cone of influence. For example, as illustrated in FIG. 6, the circuit elements 655-657 are included in the cone of influence 620 and the cone of influence 630. Further, the circuit elements 660-662 and the circuit elements 665-667 are included in the cone of influence 630 and 640, respectively The analysis engine 120 determines the dangerous detectable faults for the cone of influence for safety circuit device. For example, with reference to FIG. 6, the analysis engine 120 determines the dangerous detectable faults for the cone of influence 620 associated with the safety circuit device 612, the dangerous detectable faults for the cone of influence 630 associated with the safety circuit device 622, and the dangerous detectable faults for the cone of influence 640 associated with the safety circuit device 632. A fault is determined to be a dangerous detectable fault for a safety circuit device (e.g., the safety circuit device 612, 622, and 632 based on the determination of a propagation path from the circuit element associated with the fault to the input of a primary safety circuit device. For example, the analysis engine 120 determines a propagation path from the circuit element 655 associated with the fault 671 to the safety circuit device 622 exists. Accordingly, the fault 671 is determined to be a dangerous detectable fault. For each individual primary safety circuit device, the analysis engine 120 detects dangerous detectable fault locations through the use of forward tracing within the cone of influence for the safety circuit device. Such a process may detect all unique faults for the safety circuit device. For example, with reference to FIG. 6, circuit elements 665-667 are determined to be associated with unique faults for the safety circuit device 632.

Single point faults are dangerous undetectable faults by any primary safety circuit device. The analysis engine 120 determines the single point faults based on the difference between the union of all of the unique dangerous fault locations in cones of influence for all failure modes and the union of all of the unique dangerous fault locations of each cone of influence for each safety circuit device. The dangerous faults that may not be detectable by any safety circuit deice are identified as single point faults. For example, circuit elements 402-404 in FIG. 4 may be determined to be single point faults (or dangerous undetectable faults). The location of the dangerous faults may be used in calculating the SPFM for the corresponding failure mode. Further, the location of the singe point faults may be used in to determine if the single point failures may be detectable by adding more safety circuit devices to improve the SPFM score.

In one example, the analysis engine 120 determines whether or not a dangerous fault that is undetectable by a primary safety circuit device (e.g., a single point fault) may be mitigated. If it is determined that an undetectable dangerous fault can be mitigated, the analysis engine 120 stores an indication that the faults can be mitigated in the memory 130, provides the indication to another element of the circuit evaluation system 100, or provides the indication to another system connected to the circuit evaluation system 100.

At 760 of the method 700, latent faults and secondary safety circuit devices are determined. For example, the analysis engine 120 determines latent faults and secondary safety circuit devices based on the cones of influence of each safety circuit device, the detectable dangerous faults, and the undetectable dangerous faults (e.g., single point faults). The analysis engine 120 uses the dangerous detectable fault locations and the diagnostic points of the safety circuit devices to perform a static check of path feasibility from each dangerous detectable fault location within a cone of influence associated with failure mode to a diagnostic point of a safety circuit device or devices associated in another cone of influence failure that are not the primary safety circuit device for the dangerous detectable fault location through forward path tracing. For example, with reference to FIG. 6, the analysis engine 120 performs a static check of path feasibility between the circuit element 655 and the safety circuit device 612 and safety circuit device 632 to determine if a propagation path exists between the circuit element 655 and either of the safety circuit device 612 and 632. Based on the circuit design 600 of FIG. 6, the analysis engine 120 determines that a propagation path exists between the circuit element 655, and faults associated with the circuit element 655, and the safety circuit device 612, and that a propagation path does not exist between the circuit element 655, and the faults associated with the circuit element 655, and the safety circuit device 632. Accordingly, the safety circuit device 612 is determined to be a secondary safety circuit device for the circuit element 655. In one example, forward and/or back tracing is used to determine if paths exists between the fault locations and the safety circuit devices.

Determining the availability of secondary safety circuit devices ensure that if a primary safety circuit device becomes faulty (e.g., a fault occurs within the primary safety circuit device), a fault that occurs in a dangerous detectable locations is detectable by the secondary safety circuit device. Accordingly, the fault is not a latent fault, as the fault is detectable by the secondary circuit device when a fault occurs within the primary safety circuit device. For example, with reference to FIG. 6, based on a fault occurring in the safety circuit device 622, the safety circuit device 622 is not able to detect the fault 671 occurring at the circuit element 655 but can be detected by secondary safety circuit device 612.

In one example, a primary safety circuit device and secondary safety circuit device have at least partially overlapping safety cones (e.g., cones of influence). Faults associated with circuit elements that are included within the intersection region between the primary safety circuit and the secondary safety circuit device may be detectable by both the primary safety circuit device and the second safety circuit device. Further, propagation path exists between the circuit element and the primary safety circuit device and the second safety circuit device.

In one example, if a path is detected from a dangerous detectable fault location within a safety cone of a primary safety circuit device to the diagnostic point of a non-primary (e.g., secondary) safety circuit device, then the secondary safety circuit device is able to detect a fault at the dangerous detectable fault location. Accordingly, the secondary safety circuit device is identified as being able to detect a fault at the dangerous detectable fault location. The analysis engine 120 stores an indication that the secondary safety circuit device is able to detect a fault at the dangerous detectable fault location within the memory 130, provides the indication to another engine within the circuit evaluation system 100, or provides the indication to a processing system coupled to the circuit evaluation system 100. In one or more examples, the analysis engine 120 identifies a dangerous detectable fault location that is detectable by a secondary safety circuit device as being a latent detectable fault. The analysis engine 120 stores an indication that the secondary safety circuit device can be used to mitigate a latent detectable fault within the memory 130, provides the indication to another engine within the circuit evaluation system 100, or provides the indication to a processing system coupled to the circuit evaluation system 100.

With reference to FIG. 6, the analysis engine 120 determines that the faults associated with the circuit elements 655-657 and 660-662 are latent detectable faults associated within the circuit elements 655-657 (e.g., the fault 671) is detectable by the safety circuit device 612 when a fault occurs within the safety circuit device 622, and the faults associated with the circuit elements 660-662 (e.g., the fault 672) is detectable by the safety circuit device 632 when a fault occurs within the safety circuit device 622. The analysis engine 120 determines that the faults associated with circuit elements 650-654 are latent undetectable faults, as the faults are not detectable by a secondary safety circuit device. For example, if a fault occurs within the safety circuit device 612, any faults associated with the circuit elements 650-654 are not detectable and remain latent. The analysis engine 120 determines that the faults associated with the circuit elements 663-667 are latent undetectable faults, as the faults are not detectable by a secondary safety circuit device. For example, if a fault occurs within the safety circuit device 632, any faults associated with the circuit elements 663-667 are not detectable and remain latent. Further, the analysis engine 120 determines that the faults associated with the circuit elements 658 and 659 are latent undetectable faults, as the faults are not detectable by a secondary safety circuit device. For example, if a fault occurs within the safety circuit device 622, any faults associated with the circuit elements 658-659 are not detectable and remain latent.

In one example, the analysis engine 120 determines whether or not to add additional safety circuit devices based on the severity of the latent undetectable faults. Deciding whether or not to add safety circuit devices is done based on the preliminary results of FMEDA which reveals any shortcoming in meeting the metrics like the Latent Fault Metric (LFM). For example, at 760 of the method 700, the latent undetectable faults are used to determine whether or not to add additional (e.g., secondary safety circuit devices) in 740. An additional safety circuit device is added to the circuit design to detect latent undetectable faults associated with circuit elements that are not connected to a secondary safety circuit device. Adding additional safety circuit devices increases diagnostic coverage of latent faults within the corresponding circuit design based on the faults analysis.

With reference to FIG. 6, an additional safety circuit device is added to the circuit design 600 such that the additional safety circuit device is able to detect faults associated with the circuit elements 650-654. The additional safety circuit device may be connected to the output of the circuit element 654. Accordingly, faults associated with the circuit elements 650-654 are detectable by the additional safety circuit device and now become latent detectable faults. Further, an additional safety circuit device is added to the circuit design 600 such that the additional safety circuit device is able to detect faults associated with the circuit elements 663-667. The additional safety circuit device may be connected to the output of the circuit element 664.

Accordingly, faults associated with the circuit elements 663-667 are detectable by the additional safety circuit device and now become latent detectable faults.

At 770 of the method 700, a diagnostic coverage report is generated. For example, the analysis engine 120 determines the diagnostic coverage report for the single point fault and latent fault metrics. The single point fault and/or latent fault metrics are determined based on the number and/or location of undetectable latent faults and the number and/or location of detectable latent faults within circuit design. Further, the singe point fault and/or latent fault metrics are determined based on the number of single point fault, the number of latent faults, the number of dual-point faults, and the number of safe faults with a circuit design. In one example, the singe point fault metric is determined based on the number of dangerous faults (e.g., faults within the circuit elements and/or faults within the safety circuit device) and safe faults within a circuit design with reference to the total failure rate. The total failure rate is the probability density of failure divided by probability of survival for the safety related circuit. The total failure rate is proportional to the total number of faults. For example, the single point fault metric is determined based on a sum (or some other combination) of the dual-point faults and safe faults within a circuit design divided by the total failure rate. The latent fault metric is determined based on the dual-point faults and the safe faults of a circuit design with reference to the total dual-point faults and safe faults. In one example, the latent fault metric is determined based on the sum (or some other combination) of the dual-point faults and safe faults of a circuit design divided by the total dual-point faults and safe faults. The single point fault metric and the dual-point fault metric are further determined according to the International Organization Standardization (ISO) 26262.

Figure 8:
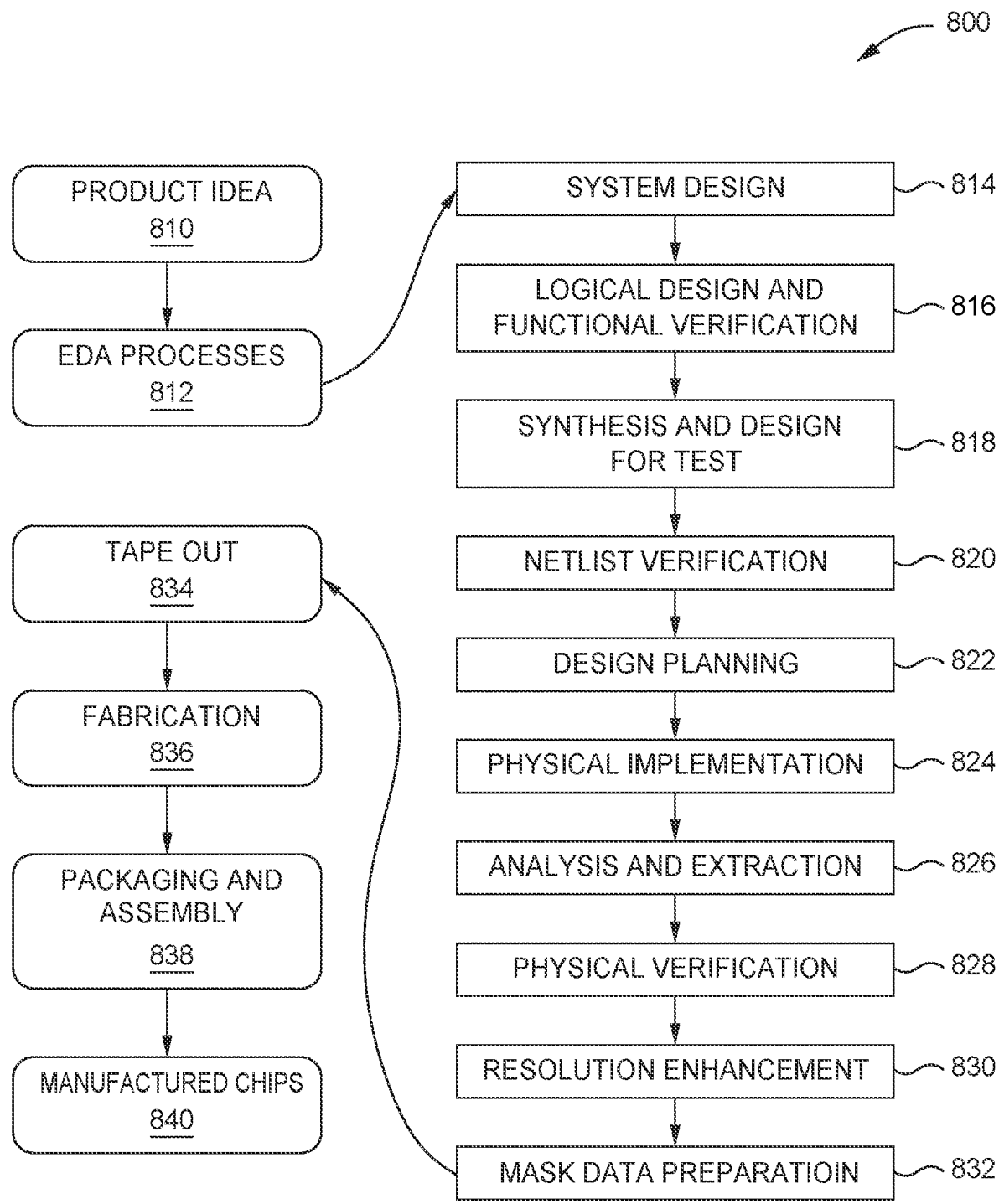
FIG. 8 depicts a flowchart of various processes used during the design and manufacture of an integrated circuit in accordance with some embodiments of the present disclosure.

FIG. 8 illustrates an example set of processes 800 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 810 with information supplied by a designer, information which is transformed to create an article of manufacture that uses a set of EDA processes 812. When the design is finalized, the design is taped-out 834, which is when artwork (e.g., geometric patterns) for the integrated circuit is sent to a fabrication facility to manufacture the mask set, which is then used to manufacture the integrated circuit. After tape-out, a semiconductor die is fabricated 836 and packaging and assembly processes 838 are performed to produce the finished integrated circuit 840.

Specifications for a circuit or electronic structure may range from low-level transistor material layouts to high-level description languages. The development of Technical Safety Concept and FMEA are specifications that capture the failure modes and safety circuit devices of the safety related design. Such information may be used during the faults analysis as described in the current proposal. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. As such a stage where the safety circuit devices are implemented. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 8. The processes described by be enabled by EDA products (or tools).

During system design 814, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 816, modules or components in the circuit are specified in one or more description languages and the specification is checked for functional accuracy. The internal safety circuit devices are implemented either within the design or modeled in the testbench if the safety circuit devices are external. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 818, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. The nodes within the netlist can be the faults used for the analysis of the single point and latent faults based on the observation and diagnostic points as described earlier. Additionally, the finished integrated circuit may be tested to verify that the integrated circuit satisfies the requirements of the specification.

During netlist verification 820, the netlist is checked for compliance with timing constraints and for correspondence with the HDL code. During design planning 822, an overall floor plan for the integrated circuit is constructed and analyzed for timing and top-level routing.

During layout or physical implementation 824, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 826, the circuit function is verified at the layout level, which permits refinement of the layout design. During physical verification 828, the layout design is checked to ensure that manufacturing constraints are correct, such as DRC constraints, electrical constraints, lithographic constraints, and that circuitry function matches the HDL design specification. During resolution enhancement 830, the geometry of the layout is transformed to improve how the circuit design is manufactured.

During tape-out, data is created to be used (after lithographic enhancements are applied if appropriate) for production of lithography masks. During mask data preparation 832, the 'tape-out' data is used to produce lithography masks that are used to produce finished integrated circuits.

A storage subsystem of a computer system (such as computer system 900 of FIG. 9) may be used to store the programs and data structures that are used by some or all of the EDA products described herein, and products used for development of cells for the library and for physical and logical design that use the library.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902 performing tasks as described for Analysis Engine 120 in FIG. 1, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930. These memories are involved in performing the tasks as described in the memory 130 of FIG. 1.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
    obtaining circuit elements, a first observation point, and a first diagnostic point of a circuit design,
        wherein the first observation point is at an output of a first circuit element of the circuit elements of the circuit design, and wherein the first diagnostic point is at an output of a first safety circuit device of the circuit design;
    determining a first cone of influence including a first subset of the circuit elements based on the first observation point,
        wherein the first subset of the circuit elements includes the first circuit element;
    determining a first safety cone including a second subset of the circuit elements based on the first diagnostic point, wherein the first safety cone includes the first safety circuit device; and
    determining a fault type associated with the circuit elements based on an intersection between the first cone of influence and the first safety cone.

2. The method of claim 1 further comprising:
    determining that the first subset of the circuit elements within the first cone of influence is associated with the fault type of a dangerous fault type that affects a safety goal of the circuit design.

3. The method of claim 2 further comprising:
    determining a third subset of the circuit elements that are outside the first cone of influence, wherein the third subset of the circuit elements is associated with the fault type of a non-dangerous fault type that does not affect the safety goal of the circuit design, and wherein the third subset of the circuit elements are determined based on a difference between the circuit elements and the first subset of the circuit elements.

4. The method of claim 1 further comprising:
    determining that the second subset of the circuit elements that are within the first safety cone is associated with the fault type of a dangerous fault type that is detectable by the first safety circuit device.

5. The method of claim 4, further comprising:
    determining a fourth subset of the circuit elements that is excluded from the first safety cone, wherein the fourth subset of the circuit elements is associated with the dangerous fault type that is undetectable by the first safety circuit device, and wherein determining the fourth subset of the circuit elements is based on a difference between the first subset and the second subset of the circuit elements.

6. The method of claim 1 further comprising:
    obtaining a second diagnostic point of the circuit design; and
    determining a second safety cone including a third subset of the circuit elements based on the second diagnostic point, wherein the second safety cone includes a second safety circuit device.

7. The method of claim 6, further comprising determining one of the circuit elements within an intersection of the circuit elements between the first safety cone and the second safety cone, the one of the circuit elements is associated with the fault type of a latent detectable fault type that is detectable by the second safety circuit device if the first safety circuit device has a fault.

8. The method of claim 6, further comprising determining one of the second subset of the circuit elements that is within the first safety cone and outside the second safety cone, the one of the second subset of the circuit elements is associated with the fault type of a latent undetectable fault type that is not detectable by the second safety circuit device if the first safety circuit device has a fault.

9. The method of claim 1, wherein determining the first cone of influence comprises performing at least one or more of back tracing from the first observation point to a first input of the circuit design, and forward tracing from the first input to the first observation point.

10. The method of claim 1, wherein determining the first safety cone comprises performing at least one or more of back tracing from the first diagnostic point to a first input of the circuit design, and forward tracing from the first input to the first diagnostic point.

11. A method comprising:
obtaining circuit elements, a first observation point, and a first diagnostic point of a circuit design, wherein the first observation point is at an output of a first circuit element of the circuit elements of the circuit design, and wherein the first diagnostic point is at an output of a first safety circuit device of the circuit design;
determining a first cone of influence including a first subset of the circuit elements based on the first observation point, the first subset including the first circuit element;
determining a first safety cone including a second subset of the circuit elements based on the first diagnostic point, wherein the first safety cone includes the first safety circuit device;
determining that the first subset of the circuit elements within the first cone of influence is associated with a dangerous fault type that affects a safety goal of the circuit design;
determining a third subset of the circuit elements that are outside the first cone of influence based on a comparison between the first subset of circuit elements and the circuit elements, wherein the third subset of the circuit elements is associated with a non-dangerous fault type that does not affect the safety goal of the circuit design;
determining that the second subset of the circuit elements that are within the first safety cone is associated with a dangerous fault type that is detectable by the first safety circuit device; and
determining a fourth subset of the circuit elements associated with a non-detectable dangerous fault type that is not-detectable by the first safety circuit device based on a comparison of the first subset of the circuit elements and the second subset of the circuit elements.

12. The method of claim 11 further comprising:
obtaining a second diagnostic point of the circuit design, the second diagnostic point is at an output of a second safety circuit device of the circuit design; and
determining a second safety cone including a fifth subset of the circuit elements based on the second diagnostic point, wherein the second safety cone includes the second safety circuit device.

13. The method of claim 12, further comprising determining one of the circuit elements that is in an intersection between the first safety cone and the second safety cone, the one of the circuit elements is associated with a latent detectable fault type that is detectable by the second safety circuit device if the first safety circuit device has a fault.

14. The method of claim 12, further comprising determining a second circuit element that is within the second subset of the circuit elements and outside the fifth subset, the second circuit element is associated with a latent undetectable fault type that is not detectable by the second safety circuit device if the first safety circuit device has a fault.

15. The method of claim 11, wherein determining the first cone of influence comprises performing at least one or more of back tracing from the first observation point to a first input of the circuit design, and forward tracing from the first input to the first observation point, wherein each of the first subset is along a propagation path between the first observation point and the first input.

16. The method of claim 11, wherein determining the first safety cone comprises performing at least one or more of back tracing from the first diagnostic point to a second input of the circuit design, and forward tracing from the second input to the first diagnostic point, wherein each of the second subset is along a propagation path between the first diagnostic point and the second input.

17. A system comprising:
a memory storing instructions; and
a processor, coupled with the memory and configured to execute the instructions, the instructions when executed cause the processor to:
obtain circuit elements, a first observation point, and a first diagnostic point of a circuit design, wherein the first observation point is at an output of a first circuit element of the circuit elements of the circuit design, and wherein the first diagnostic point is at an output of a first safety circuit device of the circuit design;
determine a first cone of influence including a first subset of the circuit elements based on the first observation point, wherein the first subset of the circuit elements includes the first circuit element;
determine a first safety cone including a second subset of the circuit elements based on the first diagnostic point, wherein the first safety cone includes the first safety circuit device; and
determine a fault type associated with the circuit elements based on an intersection between the first cone of influence and the first safety cone.

18. The system of claim 17, wherein the processor is further caused to:
determine that the first subset of the circuit elements within the first cone of influence is associated with the fault type of a dangerous fault type that affect a safety goal of the circuit design; and
determine a third subset of the circuit elements that are outside the first cone of influence, wherein the third subset of the circuit elements is associated with the fault type of a non-dangerous faults that does not affect the safety goal of the circuit design.

19. The system of claim 17, wherein the processor is further caused to:
determine that the second subset of the circuit elements that are within the first safety cone is associated with the fault type of a dangerous fault type that is detectable by the first safety circuit device; and
determine a fourth subset of the circuit elements that is excluded from the first safety cone, wherein the fourth subset set of the circuit elements is associated with the dangerous fault type that is undetectable by the first safety circuit device.

20. The system of claim 17, wherein the processor is further caused to:
obtain a second diagnostic point of the circuit design;
determine a second safety cone including a third subset of the circuit elements based on the second diagnostic point, wherein the second safety cone includes a second safety circuit device; and
determine one of the circuit elements within an intersection of the circuit elements between the first safety cone and the second safety cone, the one of the circuit elements is associated with the fault type of a latent detectable fault type that is detectable by the second safety circuit device if the first safety circuit device has a fault; and
determine one of the second subset of the circuit elements that is within the first safety cone and outside the second safety cone, the one of the second subset of the circuit elements is associated with the fault type of a latent undetectable fault type that is not detectable by the second safety circuit device if the first safety circuit device has a fault.

* * * * *